INVENTORS
CHARLES H. CURREY,
CURTIS B. BENDELL,
A. C. LEWIS BROWN AND
DONALD E. HASELWOOD
by Mason, Kolehmainen, Rathburn and Wyss
ATTORNEYS Nov. 29, 1966 C. H. CURREY ET AL 3,289,170

DATA TRANSMITTING AND RECEIVING SYSTEM USING PULSE WIDTH MODULATION

Filed Oct. 24, 1962 7 Sheets-Sheet 6

3,289,170

DATA TRANSMITTING AND RECEIVING SYSTEM USING PULSE WIDTH MODULATION

Charles H. Currey, Palatine, Curtis B. Bendell, Park Ridge, Arthur Charles Lewis Brown, Evanston, and Donald E. Haselwood, Deerfield, Ill., assignors to A. C. Nielsen Company, Chicago, Ill., a corporation of Delaware Filed Oct. 24, 1962, Ser. No. 232,684
30 Claims. (Cl. 340—172.5)

This invention relates to a data handling system and, more particularly, to a system including new and improved means for receiving and transmitting data.

In systems and apparatus for determining the listening habits of wave signal receiver users, data relating to the on-off and tuning conditions of wave signal receivers is automatically collected and stored in attachments connected to the receivers located in the geographically scattered homes of the collaborators included in the sample. In some systems, the data is stored in the receiver attachment in a permanent form on a record, and the records from the homes in the sample are collected and transported to a central office in which the stored data is reproduced and supplied to tabulating equipment. In other systems, the data collected in the homes is stored in temporary form in the attachments, and the attachments are connected over a suitable signaling or data transmission channel, such as a telephone or telemetering line, to a central office containing tabulating and recording means. The central office can initiate the sequential or concurrent transmission of the collected data from the attachments at any desired time.

Since it may be necessary for the central office to be a considerable distance from the home units or receiver attachments, the lengths of the signaling channels are correspondingly long. If the signaling channels to be used are telephone or telegraph lines, the rental costs of the channels can be considerably reduced by employing a data transmission technique that is compatible with low quality lines. However, the techniques and lines used must be such that the accuracy of the data transmitted between the central office and the home units is assured. Further, because of the line lengths involved, the system should include means for detecting and preventing errors due to varying line conditions, such as phase shift or impedance change, and should also include means for detecting and preventing transmission from home units in an improper operating condition. In view of the fact that the receiver attachments are disposed in the collaborators' homes, it is necessary that the data transmitting and receiving components comprising the home units be noiseless and as small as possible.

Accordingly, one object of the present invention is to provide a new and improved signaling system.

Another object is to provide a system including new and improved means for receiving data from and transmitting data to a signaling channel or link.

A further object is to provide a signaling system including a plurality of signaling units connected to a common signaling channel in which novel means are provided for rendering selected ones of the units effective to transmit data to the channel.

Another object is to provide a signaling unit including new and improved means for receiving and decoding pulse width modulated signals.

A further object is to provide a signal receiving unit including a pair of different duration timing means for controlling the decoding and translation of received pulse width modulated signals.

A further object is to provide a signaling unit including new and improved means for generating and transmitting pulse width modulated signals.

Another object is to provide a signaling unit in which pulse width coded signals are transmitted under the control of a pair of different duration timing means controlled by stored data.

Another object is to provide a signaling unit in which a counting means operates in sequence to control both the reception and transmission of pulse width modulated signals.

Another object is to provide a signaling unit in which a logic gate and a pair of monostable circuits are used to detect and translate pulse width modulated signals.

In accordance with these and many other objects, one embodiment of the invention comprises a signaling system for automatically collecting information relating to the listening habits of wave signal receiver users including a central office located in one geographical area and a plurality of receiver attachments or home units located in the home of the collaborators in the sample, which homes are in scattered geographically remote locations relative to the central office. As an example, the central office might be located in Chicago, Illinois, and the remote home units located in such geographically remote areas as California, New York and Florida. The central office and the home units are interconnected by one or more signaling channels, such as telephone and telegraph lines, and, in order to reduce the rental costs of these lines, a plurality of home units are connected to each of the lines.

Each of the home units includes means connected to and controlled by one or more television receivers in the home for supplying binary coded signals representing the on-off and tuning conditions of the receiver or receivers. These home units also include decoding or translating means responsive to selecting or address signals received from the central office for rendering the home unit effective to transmit the on-off and tuning condition information to the central station when the address individual to each home unit is received. The home units each include transmitting means controlled by the on-off and tuning condition information supplied by the receiver for transmitting this information over the signaling channel to the central office. The central office includes control circuitry for serially transmitting the addresses of different home units over the signaling channel to select the home unit from which a reply is desired. The central office also includes tabulating or accounting equipment for receiving the data or replies transmitted from the home units and for performing arithmetical or other data handling operations on the received data to place it in a form suitable for use.

In general, the system utilizes a loop signaling technique for transmitting address information from the central office to the home units and intelligence information from the home units to the central office. The transmitted data is in a binary coded form in which a short duration signal, such as an open or closed circuit condition, represents a binary bit "0" and another signal, such as an open or closed circuit condition, existing for a longer period of time represents a binary bit "1." When a particular home unit identified by a particular address is to be selected by the central office, the central office transmits a pattern of long and short impulses comprising any mixture of closed circuit (mark) or open circuit (space) conditions preceded by a long space condition that is used to prepare all of the home units on a given signaling channel for receiving an address.

To provide means for detecting the address signal, each home unit includes a single AND gate having one input responsive to signals derived from the signaling channel and two additional inputs that are enabled for a longer period of time or a shorter period of time by a pair of monostable multivibrators. These two monostable multivibrators are selectively interconnected with the first eight stages of a twelve stage counter in the home unit in accordance with the pattern of long and short signals representing the known address of the home unit. The counting chain is driven step-by-step under the control of the signals received from the signaling channel so that the AND gate is partially enabled for corresponding long or short periods of time. If the pulses received by the home unit from the signaling channel correspond to the known pattern of signals representing the home unit address, the home unit is prepared to transmit a reply containing turning condition data and on-off data to the central office. Alternatively, if the pattern of long and short signals in the received address do not correspond to the known pattern, i.e., if a long duration signal is received when a short duration signal is expected, the AND gate is fully enabled to reset a flip-flop which prevents the home unit from initiating a reply or data transmitting operation. Since the addresses assigned to all of the home units on a single signaling channel are different, only a single one of the home units is conditioned for a reply operation at the termination of the transmission of a single address signal from the central office, and the reply operation of the remaining home units is inhibited.

The central office then transmits a long mark signal of a duration exceeding that used to transmit address and intelligence information which initiates reply or return transmission of data from the selected home unit to the central office. When this long mark signal is received, the address receiving portion of the selected home unit is disabled, the counting means is reset to a normal condition, and an output relay and driver are rendered responsive to control by a pair of monostable multivibrators. One of these multivibrators is controlled from the signaling channel and the other multivibrator is controlled by a plurality of AND gates. These gates are enabled in sequence by the counting means and are further enabled or inhibited under the control of the binary coded information supplied from the receiver representing the on-off condition of the receiver and its tuning condition. Incident to the resetting operation, the output relay is operated to open the signaling line so that a signal is sent back from the line to advance the counter from its first setting and to operate the short duration monostable multivibrator so that the line relay is conditioned to be restored to a closed circuit condition after the elapse of the short period of time representing a short duration signaling impulse.

When the counter is advanced to its first setting, the first AND gate is partially enabled. If the first binary bit of the reply code is "0," the timing out of the short duration monostable multivibrator restores the output device to its normal condition so that the signaling line will be closed at the expiration of the shorter interval of time to provide an initial binary code bit "0." Alternatively, if the signal provided from the receiver attachment completes the enabling of the AND gate controlled by the first counting stage, the second monostable multivibrator, which resets after a longer period of time, is operated to a set condition. The output of this multivibrator prevents the short duration multivibrator from restoring the output relay so that this relay is restored to a normal condition to reclose the signaling channel only after the expiration of the longer interval of time. Thus, the first code bit transmitted is of a longer duration representing a binary bit "1." The release of the line relay at the expiration of either the longer or shorter period of time provides another operating signal for advancing the counter. This intermittent operation continues until such time as all of the necessary data has been transmitted from the home unit to the central office. At the conclusion of the data transmitting operation, further operation of the selected home unit is arrested, and the central office transmits the address representing the next home unit from which information is desired.

Many other objects and advantages of the present invention will become apparent when considering the following detailed description in conjunction with the drawings, in which:

FIGS. 1–6 form a schematic diagram of a signaling system embodying the present invention;

Figure 1:
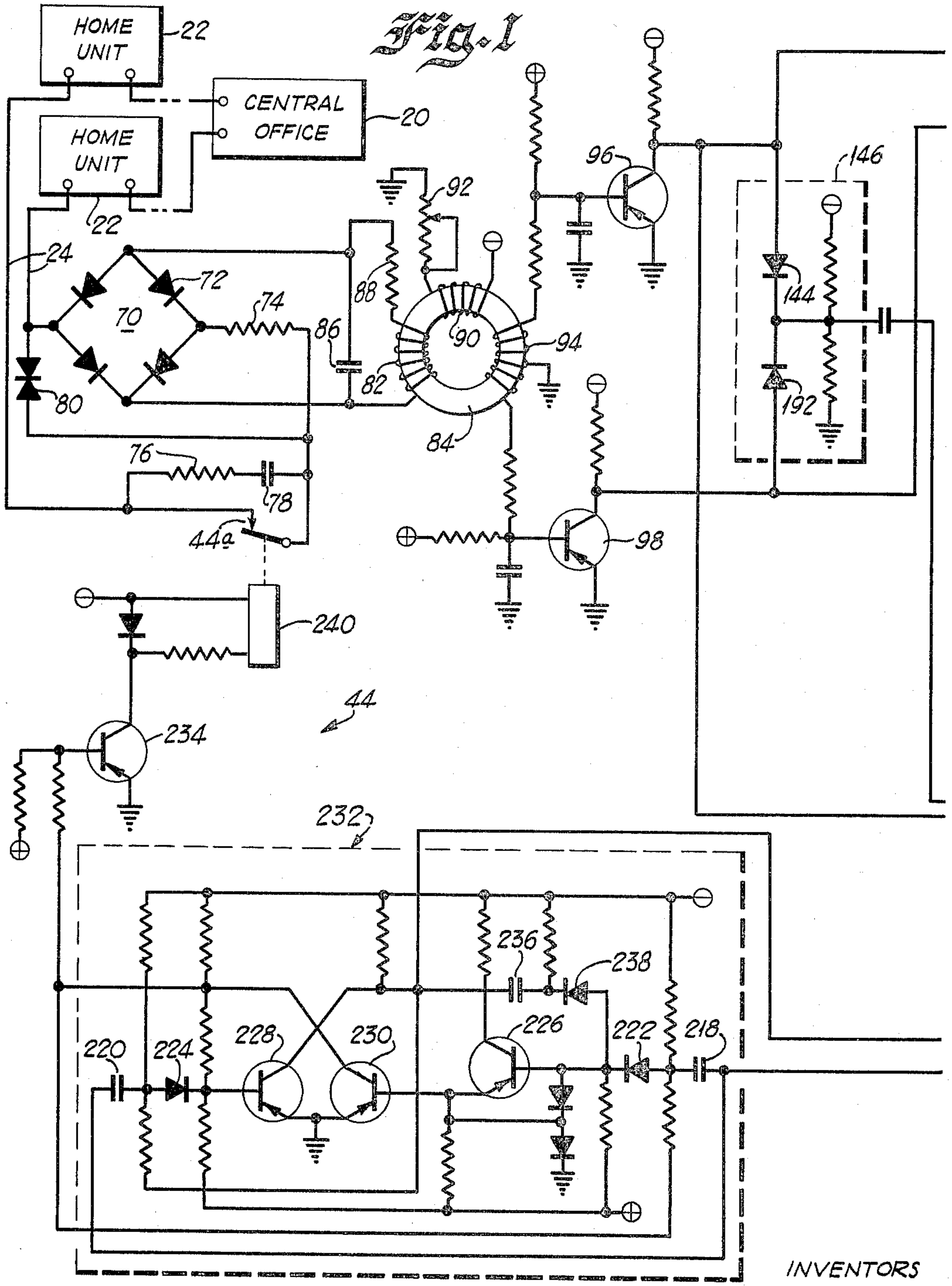
Figure 2:
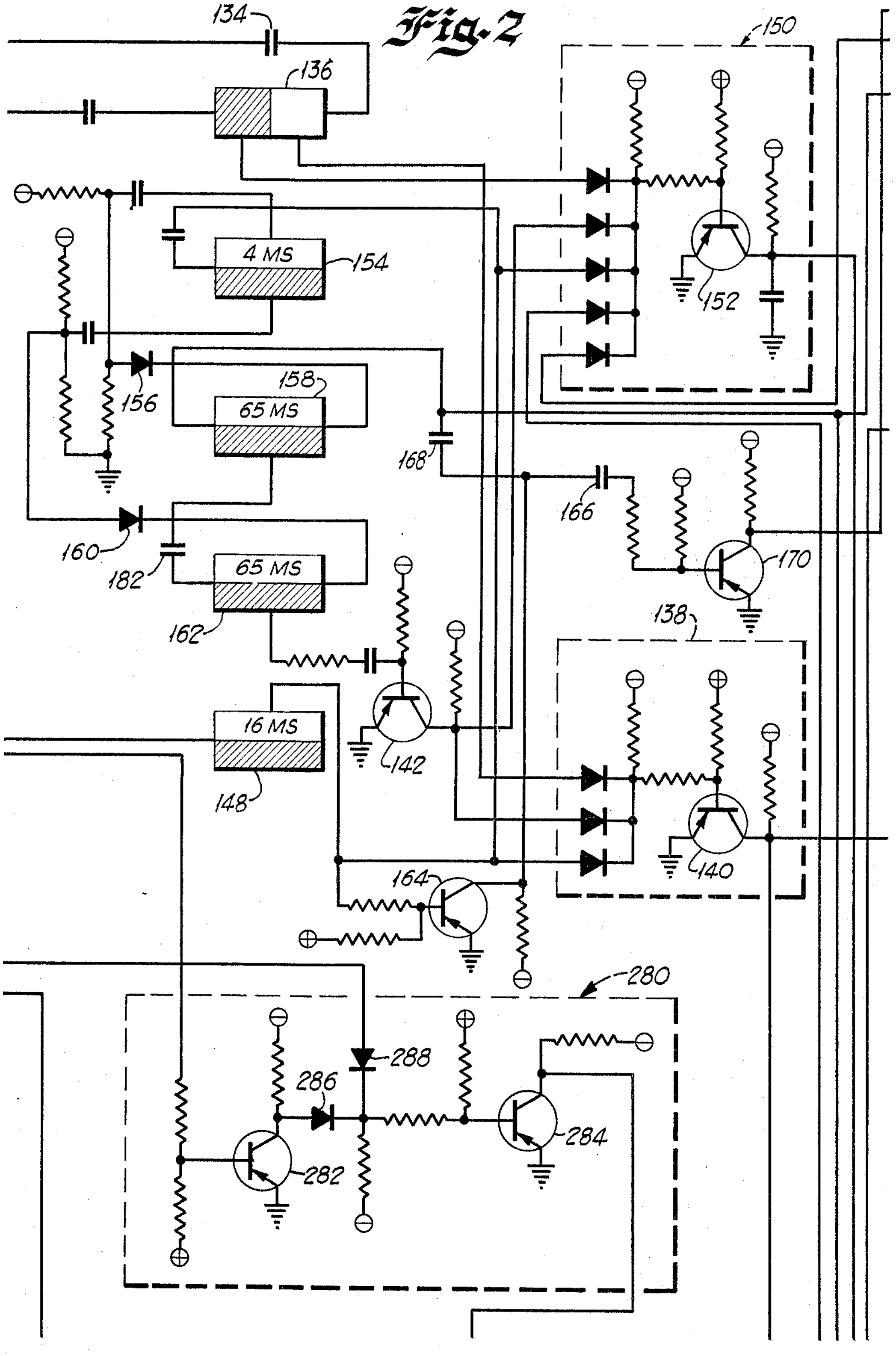
Figure 3:
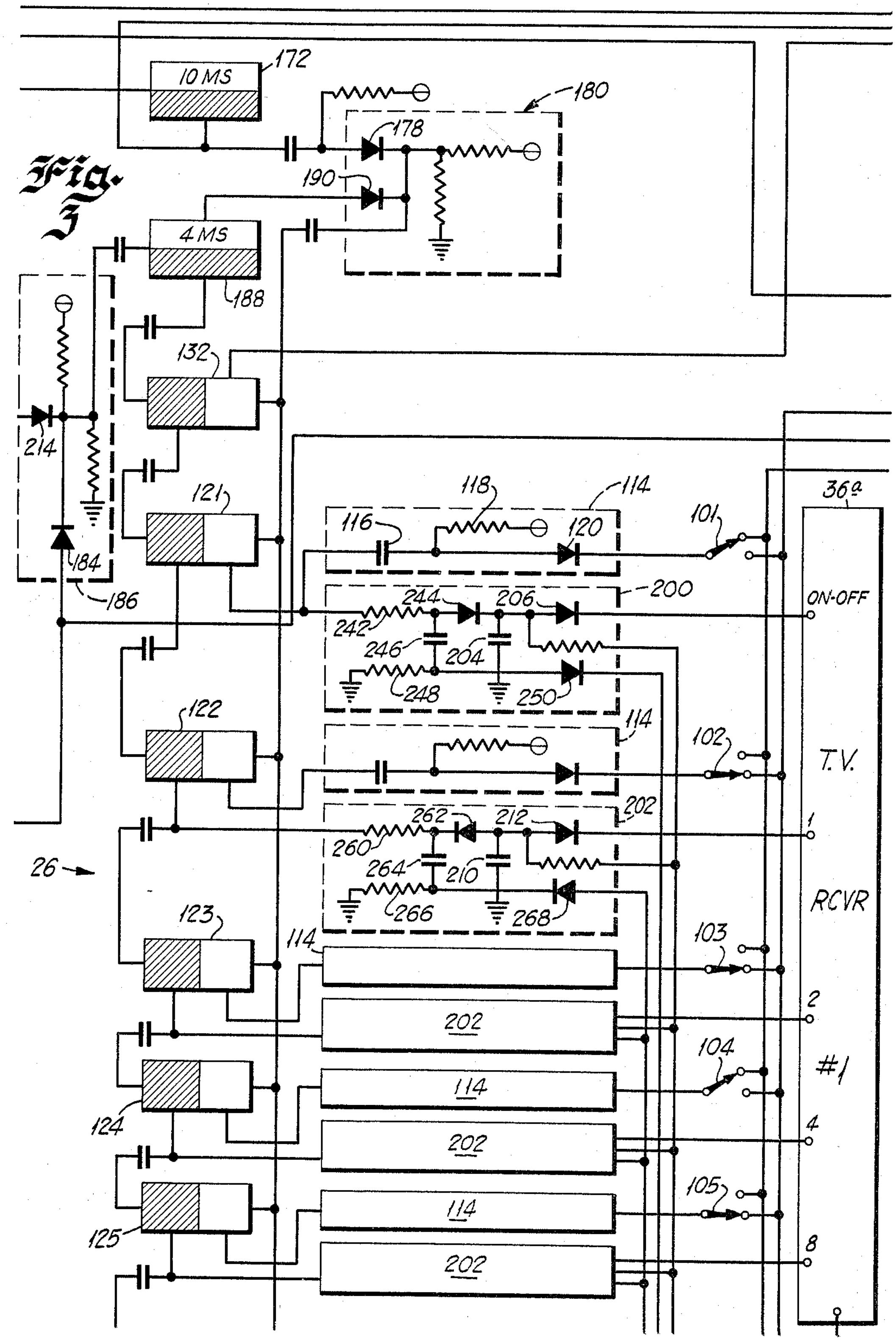
Figure 4:
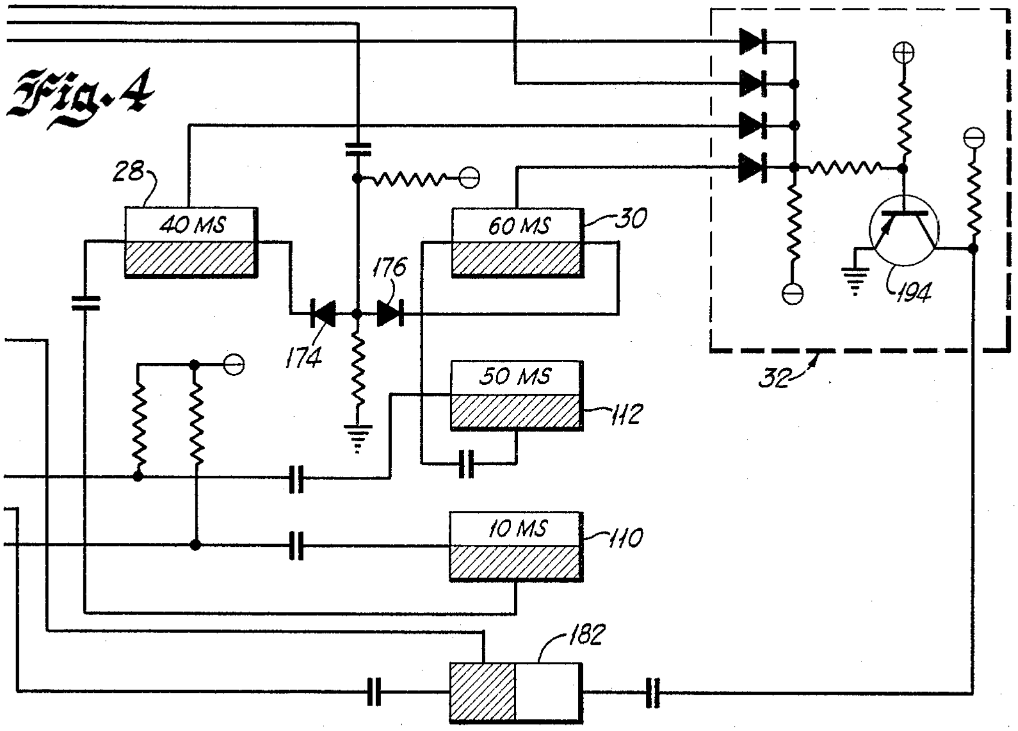

Referring now more specifically to the drawings, therein is shown a signaling system which embodies the present invention and which includes a central office 20 (FIGS. 1, 9 and 10) that is connected to a plurality of home units 22 by one or more signaling channels 24. The central office 20 includes means for transmitting a series of successive address signals over the channel 24 to the home units 22 so that the home units are rendered effective in sequence to transmit the desired data back over the channel 24 to the central office 20. Thus, the central office 20 also includes means for receiving the data transmitted from the home units 22 and for converting the received data into a form in which it can be used to indicate the listening habits of the wave signal receiver users involved in the sample.

Each of the home units 22 includes a detecting or translating means that monitors the address signals transmitted from the central office and, upon receipt of the address individual to a given one of the home units, conditions this home unit for transmitting data back to the central office 20. Each of the home units 22 also includes signal generating means controlled by coded information received from one or more television or other wave signal receivers in the home for transmitting data representing the on-off condition and the tuning condition of the receiver.

In order to permit the signaling channel 24 to be a relative low cost transmission means, such as a telegraph or low grade telephone line, the address and intelligence data is transmitted between the central office 20 and the plurality of home users 22 by the use of a pulse width modulation technique in which the length of either a mark (closed circuit) signal or a space (open circuit) signal determines the character of the data bit. In the illustrated system, an open or closed circuit condition (space or mark signal) persisting for a duration of approximately 36 milliseconds represents the binary bit "0," and a mark or space signal having a duration of approximately 100 milliseconds represents a binary bit "1." The central office 20 also transmits a long space signal having a duration of around 200 milliseconds to condition the home units 22 for receiving an address signal and a long mark signal of around 200 milliseconds duration for initiating a reply from a previously selected one of the plurality of home units 22. This type of signaling technique is substantially insensitive to noise and is not adversely affected by varying line conditions, such as excessive phase shift and attentuation.

Figure 9:
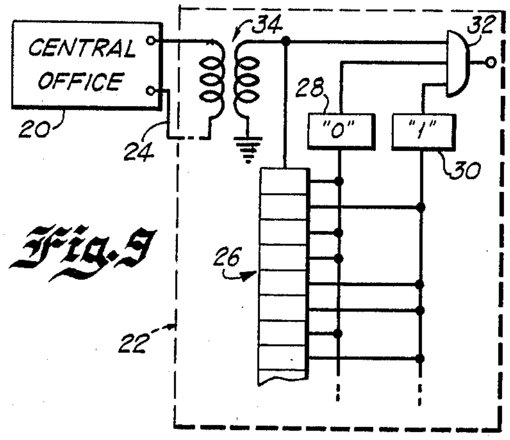
FIG. 9 is a simplified schematic diagram illustrating the address detecting portion of the circuit shown in FIGS. 1–6.

FIG. 9 of the drawings illustrates, in simplified form, the address detection technique used in the home units 22. Each of the home units 22 includes a counting means 26 having at least as many counting stages as the number of binary bits in the longest address code. The successive stages of the counting means 26 are selectively interconnected with a pair of monostable multivibrators 28 and 30 in accordance with the pattern of long and short duration signals providing the coded representation or address of the home unit 22. The monostable circuit 28, which provides a time delay corresponding to the short duration or binary bit "0" signal, is selectively interconnected with the stages of the counter 26 in accordance with the positions in the address word in which a binary bit "0" is present. The monostable circuit 30, which provides a time delay corresponding to the longer duration or binary bit "1" signal, is connected to those stages of the counting means 26 in which binary bits "1" appear in the address individual to the home unit 22. The monostable circuits 28 and 30 provide inhibiting signals to two inputs of an AND gate 32. The remaining input to the AND gate 32 is coupled to the signaling line 24 through any suitable means, such as a coupling transformer 34 shown in FIG. 9 of the drawings.

When a long space signal has been received indicating that a series of pulse width modulated signals representing the address of one of the plurality of home units 22 is to be transmitted by the central office 20, the address detecting portion of the home units 22, illustrated schematically in FIG. 9, is rendered responsive to the signals supplied to the signaling channel 24, and the first stage of the counter 26 is operated to selectively actuate one of the monostable circuits 28 and 30. As illustrated in FIG. 9, the first counting stage is connected to the "0" monostable 28 and this circuit 28 is actuated to apply an inhibiting signal to the AND gate 32 for a short period of time. Accordingly, if the first address signal transmitted by the central station 20 is a short duration pulse representing "0," the gate 32 is inhibited when the transformer 34 provides an enabling signal at the end of the transmitted signal. Thus, the gate 32 does not provide an output. Alternatively, if the first address bit transmitted from the central office is of a long duration representing "1," the monostable circuit 28 times out and removes the inhibit from the gate 32 before the end of the transmitted pulse. The gate 32 is then completely enabled by the transformer 34 at the end of the binary "1" signal and provides an output signal. This signal is stored in the home unit 22 and inhibits the operation of pulse generating means in this unit so that a reply cannot be transmitted. The setting of the circuit 30 by the operation of a connected counter stage is delayed so that the receipt of not only a signal longer than one representing a binary bit "1" but also a signal shorter than a binary "1" will result in the complete enabling of the gate 32.

The counter 26 is advanced step-by-step by each transition of the line 24 between mark or space conditions, and the counter selectively operates the monostable circuits 28 and 30 so that the AND gate 32 is sequentially conditioned to expect either a long duration or a short duration signal in dependence upon the pattern of bits "1" and "0" comprising the address of the circuit. If the counter 26 is advanced through all of the stages connected to the monostable circuits 28 and 30 without the AND gate 32 becoming completely enabled, an indication is provided that the transmitted address is that of the illustrated home unit 22, and this circuit is conditioned to supply a reply to the central office 20 when a request therefor is made by the central office.

Figure 10:
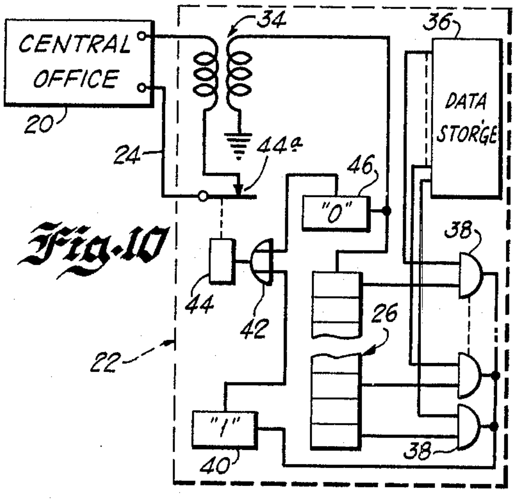
FIG. 10 is a simplified schematic diagram of the data transmitting portion of the circuit shown in FIGS. 1–6.

FIG. 10 of the drawings illustrates, in a simplified form, the means provided in each home unit 22 for transmitting a reply to the central office 20 over the signaling channel 24 whenever the home unit 22 has been selected for reply by the preceding transmission of a correct address signal. The reply transmitting portion of the home unit 22 includes a data storage means, indicated generally as 36, which is controlled by a connected television or wave signal receiver or receivers to provide a binary coded representation of the on-off and tuning condition of the connected receiver or receivers. Each of the outputs of the data storage means 36 is connected to one input of an AND gate 38, the other input of each of which is connected to one stage of the counting means 26. The data storage means 36 selectively supplies enabling potentials to the inputs of the AND gates 38 in accordance with a binary coded representation of the on-off condition and tuning condition of the connected receiver or receivers. The outputs of the AND gates 38 are connected to the input of a monostable device 40 having a longer duration time delay corresponding to a binary bit "1." The output of the monostable circuit 40 is connected through an OR gate 42 to the input of an output means 44. Another input to the OR gate 42 is connected to the output of a monostable circuit 46 having a shorter time delay corresponding to a binary bit "0." The input of the monostable circuit 46 is connected to the signaling channel 24 through the input transformer 34.

Assuming that the home unit 22 shown in FIG. 10 has been conditioned for a reply operation by the receipt of a sequence of pulse width modulated signals representing its address and that a long mark signal has been transmitted by the central office 20 to trigger the reply transmission from the home unit 22, the output device 44 is operated to open a pair of normally closed contacts 44*a* to interrupt the signaling channel or line 24 and to establish a space condition. This interruption of the signaling loop couples a signal through the input transformer 34 to operate the monostable device 46 and to operate the counting means 26 to its first setting so that the first AND gate 38 is at least partially enabled. If the data storage means 36 supplies a signal to the other input of this AND gate representing a binary bit "1," the monostable circuit 40 is also operated to a set condition. Alternatively, if the data storage unit 36 provides a binary bit "0" indication, the gate 38 is not enabled and the monostable circuit 40 is not set.

Whenever the monostable circuit 46 or the circuit 40, if set, times out, thus providing either a short duration or a long duration delay, a signal is forwarded through the OR gate 42 to operate the reply driver or output unit 44 to its alternate condition, in this case to reclose the contacts 44*a* to initiate the next signal bit of the reply. This reclosure of the contacts 44*a* or this transition in the condition of the signaling channel 24 also couples another signal through the transformer 34 to again set the short duration monostable circuit 46 and to advance the counter 26 to its next setting in which the next of the AND gates 38 is partially enabled. Thus, the output driver unit 44 is always conditioned to provide a short duration pulse by the monostable circuit 46, the eect of which is selectively overridden by the longer duration monostable circuit 40 if this circuit is set under the control of the counting circuit 26, the data storage unit 36, and the AND gates 38 to transmit a binary "1." This operation continues until all of the bits of reply information have been transmitted.

In the detailed circuit diagram shown in FIGS. 1–6 of the drawings, the bistable and monostable circuits are illustrated by the use of logic symbols. Although the circuits represented by the symbols are conventional, FIGS. 7 and 8 of the drawings illustrate certain typical bistable and monostable circuits that can be used together with the logic symbols therefor.

Figure 7A:
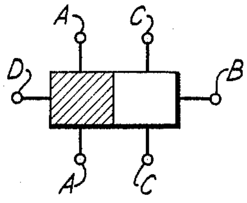
FIGS. 7A and 7B illustrate a logic symbol and a typical circuit for a bistable circuit used in the schematic diagram of FIGS. 1–6.
Figure 7B:
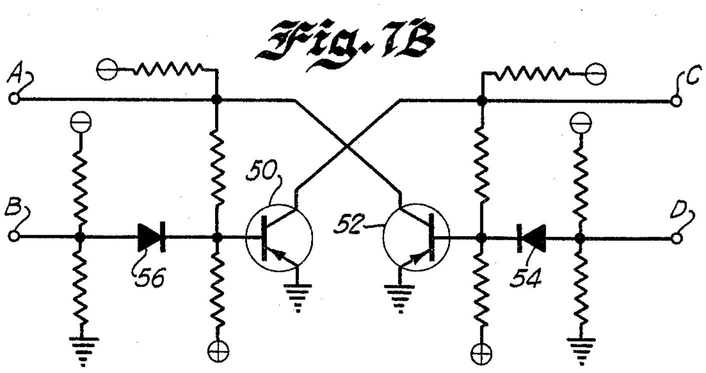

FIG. 7A illustrates the logic symbol for a bistable circuit or flip-flop, and FIG. 7B illustrates the details of a typical bistable circuit. The flip-flop includes a pair of cross-connected transistors 50 and 52. Assuming that the transistor 52 is in a conductive state, an output terminal A connected to its collector electrode is connected to substantially ground potential through the transistor 52, as indicated by the lined portion of the logic symbol in FIG. 7A. The nonconductive transistor 50 includes a collector electrode connected to an output terminal C to which a negative potential is normally applied, as indicated by the open section of the logic symbol in FIG. 7A. When a positive-going signal is applied to a set input terminal D, this signal is coupled through a diode 54 and applied to the base electrode of the conductive transistor 52 so that this transistor is placed in a nonconductive state. The potential at the terminal A now drops to a more negative value, and a more negative potential is supplied to the base electrode of the transistor 50 so that this transistor is placed in a conductive condition to apply substantially ground potential to the output terminal C. When the transistor 50 is placed in a conductive condition, terminal C of the voltage divider connected to the base electrode of the transistor 52 is connected to ground so that a positive potential is applied to the base of the transistor 52 to hold this transistor in a nonconductive condition. The flip-flop or bistable circuit shown in FIG. 7B can be restored to its alternate conductive state by applying a positive-going signal from a reset input terminal B to the base of the transistor 50 through a diode 56.

Figure 8A:
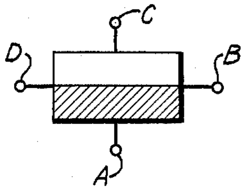
FIGS. 8A and 8B illustrate a logic symbol and a typical circuit for a monostable circuit used in the system shown in FIGS. 1–6.
Figure 8B:
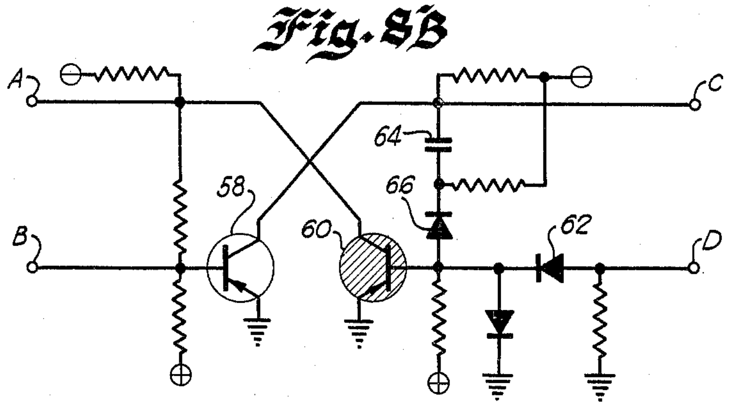
Figure 5:
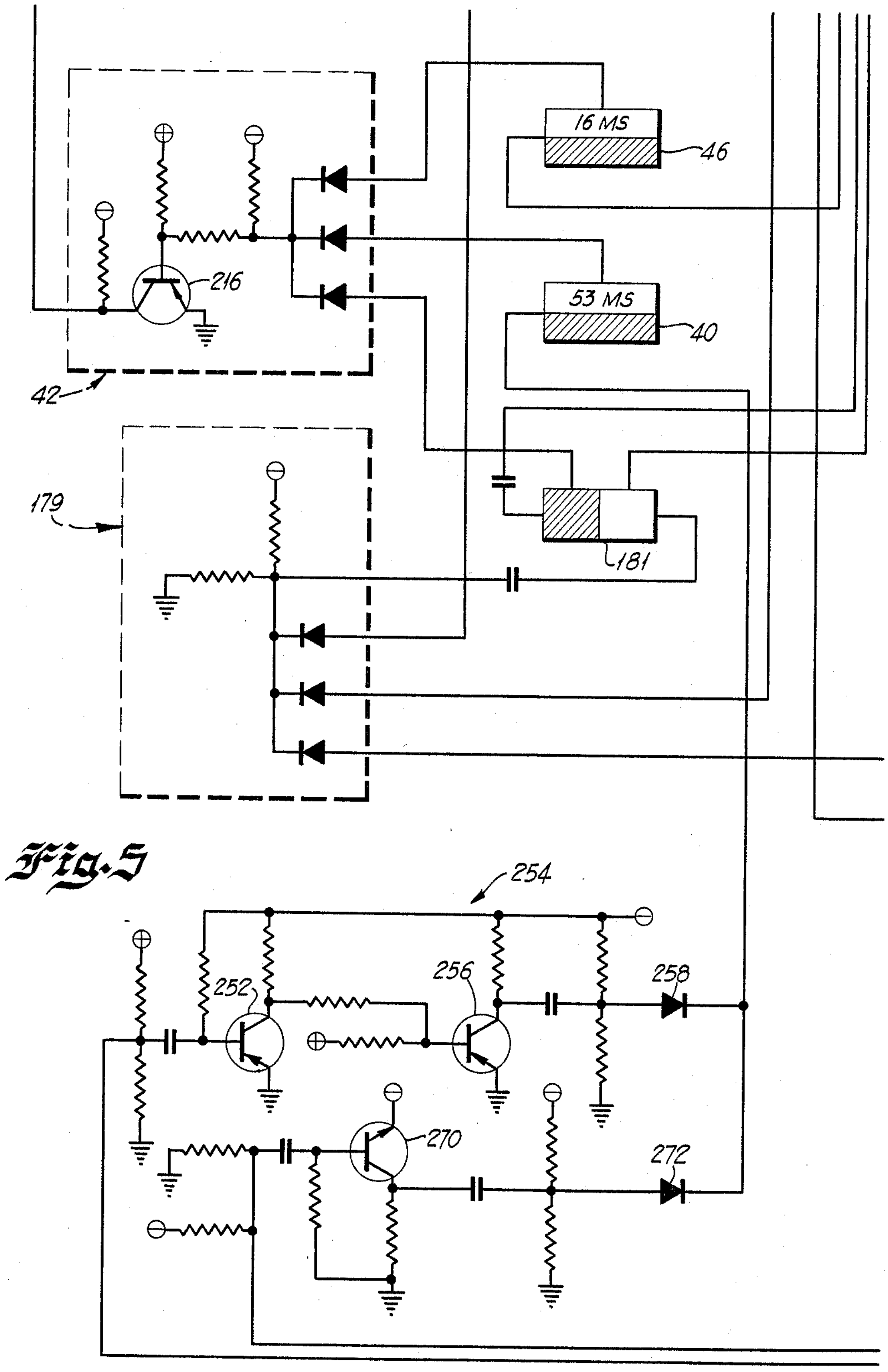
Figure 6:
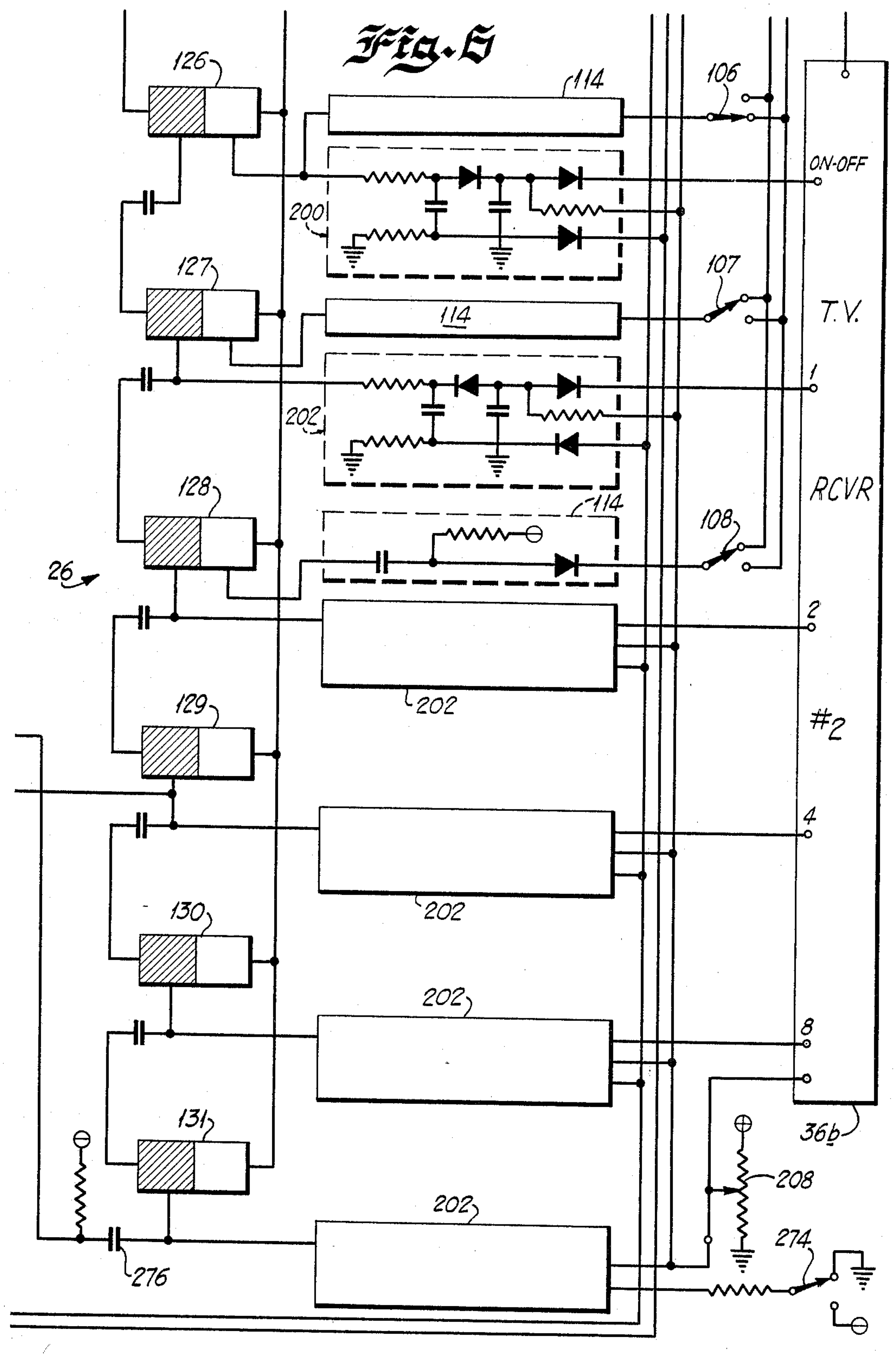

FIGS. 8A and 8B illustrate, respectively, a logic diagram for a monostable multivibrator and the circuit of a typical monostable multivibrator. In the circuit shown in FIG. 8B, a transistor 58 is normally in a nonconductive condition, and a transistor 60 is in a conductive condition. Thus, ground potential is normally supplied to an output terminal A, as indicated by the shaded portion of the logic symbol in FIG. 8A, and a negative potential is supplied to an output terminal C, as indicated by the unshaded portion of the logic symbol in FIG. 8A. When a positive-going signal is applied to an input terminal D, this signal is forwarded through a diode 62 to be applied to the base of the transistor 60. This drives the base of the transistor 60 positive with respect to its emitter, and the transistor 60 is placed in a nonconductive condition. Thus, the potential at the output terminal A drops to a more negative value. Further, when the transistor 60 is placed in a nonconductive condition, a more negative potential is applied to the base electrode of the transistor 58 from the voltage dividing network connected to its base so that this transistor is placed in a conductive condition. Thus, the potential at the output terminal C rises from a negative potential toward ground potential.

In the normal condition of the monostable circuit, a capacitor 64 is charged to a potential determined by the values of the voltage dividing network connected to its terminals. When the transistor 58 is placed in a conductive condition, one terminal of the capacitor 64 is clamped at ground potential, and the potential to which this capacitor is charged biases a diode 66 in a reverse direction so that the base of the transistor 60 is maintained at a positive potential to hold the transistor 60 in a nonconductive condition. The charge on the capacitor 64 discharges over an interval determined by the RC constant of the connected network. When the charge on the capacitor 64 is suitably dissipated, the diode 66 is no longer biased in a reverse direction and is placed in a conductive condition so that the base of the transistor 60 is again placed at a negative potential relative to its emitter. The transistor 60 now returns to a conductive condition and places the transistor 58 in a nonconductive condition so that the normal output potentials are applied to the terminals A and C. The monostable circuit can be restored to its normal condition before the end of its delay period by the application of a positive signal to an input terminal B. In the detailed circuit shown in FIGS. 1–6, the delay time of each monostable circuit is indicated in the unshaded upper portion of the logic symbol.

In the circuits shown in FIGS. 1–8, the positive terminals are supplied with a nominal positive potential of 6 volts and the negative terminals are connected to a nominal negative potential of 12 volts. However, these potentials as well as the configurations of the various circuits shown can be varied in accordance with the conditions under which the circuits are to be operated.

Referring now more specifically to FIG. 1 of the drawings, each one of the home units 22 is coupled to the signaling channel or line 24 by a full-wave input bridge 70 including four diodes 72. The input terminals to the bridge 70 are connected in series with the line 24 through a resistor 74 and the normally closed contacts **44*a* in the output means 44. These contacts 44*a* are shunted by an arc suppression circuit including a resistance element 76 and a capacitor 78. A Zener device 80 is shunted across the bridge network 70 and the series resistor 74. The bridge 70 provides means for insuring a uniform input or output to the home unit 22 in the event that the polarity of the signaling voltage is reversed. The output terminals of the bridge 70 are connected to an input winding 82 on a square loop magnetic core 84 through a network including a capacitor 86 and a resistance element 88. The core 84 is provided with a bias winding 90 connected between a source of negative potential and ground through a potentiometer 92 which permits the bias applied to the magnetic core 84 to be adjusted. An output winding 94 having a grounded tap is also provided on the core 84. One end of the winding 94 is connected to the base electrode of a transistor 96 and the other end of the winding 94 is connected to the base electrode of a transistor 98. The transistors 96 and 98** are normally biased to a nonconductive condition.

The signaling channel or line 24 normally provides a mark current of 62.5 ma. when the line is in a closed or conductive condition and provides a space current of less than 3 ma. when the line is in a nominal open circuit condition. The bias winding 90 and the output winding 94 provide an output signal to selected ones of the transistors 96 and 98 when the current through the input winding 82 passes through approximately the 31 ma. level during a change between marking and spacing conditions. The winding 94 is so disposed that when the signaling channel 24 changes from a mark condition to a space condition to indicate the beginning of a space signal, a negative-going pulse is applied to the base of the transistor 96 momentarily to place this transistor in a conductive condition. Thus, the collector of the transistor 96 provides a positive-going pulse each time that the signaling line 24 changes from a marking condition to a spacing condition at the beginning of a space pulse. Alternatively, when the signaling channel 24 changes from a space condition to a mark condition, the output winding 94 applies a negative-going pulse to the base of the transistor 98 so that this transnstor is momentarily placed in a conductive condition to provide a positive-going signal only on a transition from a space condition to a mark condition. Thus, the transistor 96 provides a space pulse output and the transistor 98 provides a mark pulse output, both of which are positive-going signals.

*Selection of a home unit 22 by the central office 20*

As set forth above, the central office 20 transmits an extra long space pulse of approximately 200 milliseconds in duration followed by a pattern of alternate mark and space signals of 36 and 100 milliseconds duration representing binary bits "0" and "1" in accordance with the coded representation of the address of the home unit 22 from which wave signal receiver data is desired. Although many different types of address coding arrangements can be used, the system shown in FIGS. 1–6 of the drawings utilizes an octal binary coded address consisting of an eight bit word. The first four bits of the word represent the binary weights or values "4," "2," "2," and "1"

of the first or tens decimal digit in the home designation. The second four bits of the word representing the binary values "4," "2," "2," and "1" correspond to the second or units decimal digit of the home unit designation. This coding technique permits the central office 20 to select up to 64 different home units 22 on a single signaling channel 24. With other codes, the eight address bits can be used to select up to 256 home units. If the home unit shown in FIGS. 1–6 is assumed to be designated by the decimal designation "46," the address code for this unit comprises the binary designation "01101100." Since the signaling channel 24 is normally in a marking condition, the central office 20 transmits the extra long space signal followed by a short mark signal, a long space signal, a long mark signal, and a short space signal as the first four bits of the address word. This pattern of transmission is illustrated in line 1 of FIG. 11.

The address individual to each of the home units 22 is stored in each of these home units by eight switches 101–108 which are manually operated to one of two alternate positions representing binary bits "0" and "1" in accordance with the eight bits in the address word designating the home unit 22. The outputs of the switches 101–108 are selectively connected to either a binary "0" monostable circuit 110 or a binary "1" monostable 112. The inputs to the switches 101–108 are connected to related stages of the counting means 26 through eight gates 114, each of which includes a coupling capacitor 116, a resistance element 118 connected to a source of negative potential, and a diode 120. The counting means 26 includes 12 counting stages 121–132 of which the counting stage 132 is a preliminary input stage. The stages 121–128 are used during the address detection operation, and the stages 121–131 are used during the data transmission operation. The set outputs of the counting stages 121–128 are each connected through one of the OR gates 114 to one of switches 101–108, respectively.

Therefore, as each of the stages 121–128 is operated during an address detecting operation, a positive-going signal is transmitted through the related gate 114 to a related one of the switches 101–108. In dependence on the setting of the switches 101–108, this pulse is further supplied to the set input of one of the monostable circuits 110 or 112 to set one of these two circuits. The outputs of the monostable circuits 110 and 112 are applied to the set inputs of the monostable multivibrators 28 and 30, respectively. Since the home unit 22 illustrated in FIGS. 1–6 is assumed to be designated by the decimal designation "46" or the binary designation "01101100," the switches 101, 104, 107 and 108 are connected between the counting stages 121, 124, 127 and 128 to the input of the binary bit "0" monostable 110. The switches 102, 103, 105 and 106 connect the outputs of the counter stages 122, 123, 125 and 126 to the inputs of the binary bit "1" monostable 112. Thus, the setting of the manually adjustable switches 101–108 stores the address individual to the illustrated home unit 22 in this unit.

When the central office 20 initiates a calling operation in which the illustrated home unit 22 is to be conditioned to send the necessary data back to the central office 20, this office first transmits a long space signal of around 200 milliseconds duration. When the signaling line or channel 24 changes from its normal marking condition to a space condition, the interruption of current flow through the input winding 82 on the core 84 energizes the winding 94 to apply a negative-going pulse to the base of the transistor 96. This momentarily places the transistor 96 in a conductive condition so that a positive-going pulse is coupled through a capacitor 134 to the reset input of a flip-flop 136. This circuit is reset so that a negative enabling potential is applied to an upper diode input of a long space pulse detecting AND gate 138, which AND gate includes an output transistor 140. The AND gate 138 is not fully enabled at this time because a normally conductive transistor 142 applies an inhibiting potential to the middle diode input of the gate 138.

The positive-going pulse provided by the collector of the transistor 96 is also forwarded through a diode 144 in an OR gate 146 to set a line delay monostable circuit 148. When the monostable circuit 148 is set, a more positive potential is applied to one of the diode inputs to the AND gate 138 and also to one input of a long mark pulse detecting AND gate 150, which AND gate includes an output transistor 152. When the monostable circuit 148 is set, its positive-going output also sets a resetting monostable circuit 154. When the monostable circuit 154 is set, a positive-going pulse is forwarded through a diode 156 to immediately reset a first long mark-space timing monostable circuit 158. After a 4 millisecond time delay, the circuit 154 restores to a normal condition and, in doing so, provides a positive-going pulse through a diode 160 for immediately resetting a second long mark-space timing monostable circuit 162 to its normal condition. The outputs of the monostable circuits 158 and 162 are connected in series with an input circuit to the normally conductive transistor 142. However, any effect that the resetting of the timing circuits 158 and 162 has on the conductive state of the transistor 142 does not affect the AND gates 138 and 150 inasmuch as these two circuits are inhibited by the output of the line delay monostable circuit 148.

When the monostable circuit 148 is first set, the output pulse from this circuit reduces the negative bias supplied to the base of a normally conductive transistor 164 so that this transistor is placed in a nonconductive state. This permits a pair of coupling condensers 166 and 168 to charge from the negative potential connected to the collector of the transistor 164. After a time delay of 16 milliseconds, the monostable circuit 148 returns to its normal condition, and the transistor 164 is again placed in a conductive condition to supply positive-going pulses through the coupling capacitors 166 and 168 (see line 2 in FIG. 11). The positive-going pulse provided by the capacitor 166 momentarily places a normally conductive transistor 170 in a nonconductive condition so that its collector supplies a negative-going pulse. The output of the transistor 170 is connected to one diode input of the AND gate 32, but the negative-going pulse provided at this time does not provide any useful function. The positive-going pulse provided by the coupling capacitor 168 sets a counter drive monostable circuit 172. This circuit resets after a 10 millisecond time delay and drives a positive-going pulse (see line 6 in FIG. 11) through a pair of diodes 174 and 176 to reset both of the timing monostable circuits 28 and 30 to a normal condition (see lines 9 and 11 in FIG. 11). The resetting of the counter drive monostable circuit 172 also supplies a positive-going pulse through a diode 178 in an OR circuit 180 to the reset inputs of all of the stages 121–132 in the counting circuit 26. This insures that the counting circuit 26 is in a normal or reset condition.

The positive-going pulse provided by the coupling capacitor 168 is also applied to the set input of the first timing monostable circuit 158 so that this circuit is reset after a time delay of 65 milliseconds. When the first timing monostable circuit 158 rests, it provides a positive-going pulse through a coupling capacitor 182 to set the second timing monostable circuit 162. After a 65 millisecond time delay, this circuit resets and applies a positive-going signal to the base of the transistor 142 so that this transistor is momentarily placed in a nonconductive condition. This provides a negative-going pulse to the collector of the transistor 142 that is applied to one diode input of each of the AND gates 138 and 150. The upper diode input to the long mark pulse AND gate 150 is inhibited by the flip-flop 136. Thus, only the long space pulse AND gate 138 is fully enabled, and a negative potential is momentarily applied to the base of the transistor 140 so this transistor is briefly placed in a conductive condition to provide a positive-going signal at its output (see line 3 in FIG. 11). Since the transistor 142 cannot be placed in a conductive condition until the expiration of the 16 millisecond time delay provided by the circuit 148 and the 130 millisecond time delay provided by the timing circuits 158 and 162, this delay of 146 milliseconds indicates that the spacing condition cannot be either a signal of 36 milliseconds representing the binary bit "0" or a 100 millisecond pulse representing a binary bit "1." Thus, an output from the long space AND gate 138 provides all of the home units 22 on the signaling channel 24 with an indication that a long space pulse has been transmitted by the central office 20 to prepare these circuits for receiving a following address word or message.

The positive-going pulse at the output of the transistor 140 is forwarded through one diode input of an OR gate 179 to the reset terminal of a reply gate flip-flop 181. This resets the flip-flop 181 to insure that the data transmitting components of the home unit 22 are disabled. The positive-going pulse at the output of the transistor 140 is also applied to the set input terminal of an address gate flip-flop 182 to operate this flip-flop to its set condition (see line 4 in FIG. 11). In this condition, a negative enabling potential is applied to the lower diode input of the long mark pulse gate 150. The address gate bistable circuit 182 provides means for indicating, at the conclusion of the transmission of the address from the central office 20, whether the transmitted address corresponds to the designation or identification of the home unit 22.

The positive-going pulse at the output of the transistor 140 is also forwarded through a diode 184 in an OR gate 186 to the set terminal of a counter reset monostable circuit 188. This sets the monostable circuit 188 (see line 5 in FIG. 11) so that a positive-going pulse is applied through a diode 190 in the OR gate 180 to the reset terminals of all of the stages 121–132 in the counter 26. This insures that the counter 26 is reset to a normal condition. After a 4 millisecond delay, the monostable circuit 188 times out and applies a positive-going pulse to the set input of the input or preliminary stage 132 in the counting means 26. This sets the counter stage 132 (see line 7 in FIG. 11) so that a more positive or ground inhibiting potential is applied to the upper diode input of the gate 32. This disables the gate 32 until the first mark or space signal forming a part of the address sequence is received from the central office 20.

Assuming that the central office is to transmit a sequence of address signals representing the designation of the illustrated home unit 22, the central office 20 restores the signaling channel 24 to a marking condition at the end of the 200 millisecond long space signal, and this transition controls the output winding 94 on the core 84 to apply a momentary negative-going pulse to the base of the transistor 98. This provides a positive-going pulse at the output of the transistor 98 that is applied to the set terminal of the flip-flop 136 so that an enabling potential is applied to one input of the long mark pulse AND gate 150 and the enabling potential is removed from one input of the long space pulse AND gate 138. The positive-going pulse provided by the transistor 98 is also forwarded through a diode 192 in the OR gate 146 to again set the monostable circuit 148. The setting of the circuit 148 inhibits the gates 138 and 150 and operates the resetting monostable circuit 154 so that both of the timing circuits 158 and 152 are restored to a normal condition.

At the end of the 16 millisecond delay provided by the circuit 148, the transistor 164 and the capacitor 166 again drive the transistor 170 (see line 2 in FIG. 11) so that a negative-going enabling signal is applied to one input of the AND gate 32. This gate, however, is disabled by the counter stage 132. The transistor 164 and the coupling capacitor 168 again set the timing circuit 158 and the counter drive monostable circuit 172. When the monostable circuit 172 times out (see line 6 in FIG. 11), a reset signal is again applied to the monostable timing circuits 28 and 30, and a reset signal is applied to all of the reset terminals of the stages 121–132 in the counter 26. This restores the set counter stage 132 to a normal condition and removes the inhibiting signal from the gate 32. The resetting of the stage 132 also supplies a positive-going signal persisting longer than the reset signal provided by the OR gate 180 to the set terminal to the first counting stage 121 so that this counter stage is operated to a set condition (see line 7 in FIG. 11).

When the counting stage 121 is set, a positive-going pulse is coupled through the capacitor 116 and the diode 120 in the first OR gate 114. This positive-going pulse is forwarded through the switch 101 to the set terminal of the binary bit "0" address monostable circuit 110. The circuit 110 is set by this input signal (see line 8 in FIG. 11). At the end of the 10 millisecond delay provided for the circuit 110, this circuit times out and forwards a positive-going signal to the set input terminal of the "0" address gate 28 to set this circuit (see lines 8 and 9 in FIG. 11). When the circuit 28 is set, an inhibiting potential is applied to one diode input of the AND gate 32. The conditions are now established for determining whether, in fact, the first pulse transmitted by the central office 20 has the shorter duration of 36 milliseconds representing a binary bit "0."

More specifically, the upper diode input to the gate 32 is enabled when the preliminary stage 132 in the counter 26 is reset, and the lower diode input to the gate 32 is enabled because the binary bit "1" timing gate 30 is in a reset condition. The set time gate 28 inhibits another diode input to the gate 32 for a 40 millisecond period following its setting, and the remaining diode input to the gate 32 is normally inhibited by the conductive transistor 170. Because of the time delay in the monostable circuits 148, 172, and 110, the time gate 28 is set 36 milliseconds following the space to mark transition at the beginning of the first address bit transmitted by the central office 20 (compare lines 1 and 8 in FIG. 11). Thus, the gate 32 is inhibited in the interval between 36 and 76 milliseconds following the beginning of the first transmitted address bit. If the central office 20 does, in fact, transmit a binary bit "0," the next line transition from mark to space occurs 36 milliseconds following the preceding space to mark transition and, in view of the 16 millisecond delay provided by the circuit 148, would provide a negative-going pulse at the output of the transistor 170 52 milliseconds following the initial space to mark transitions. This falls within the acceptance band defined by the 40 millisecond time delay of the binary bit "0" time gate 28. Thus, the gate 32 is inhibited by the monostable circuit 28 when the transistor 170 is rendered nonconductive, and no output is derived from the AND gate 32.

On the other hand, if the mark to space transition terminating the first bit of the address occurs more than 60 milliseconds following the initial space to mark transition, the negative-going pulse at the output of the transistor 170 occurs more than 76 milliseconds following this initial space to mark transition. The transistor 170 now completes the enabling of the diode inputs to the AND gate 32, and an output transistor 194 in the gate 132 supplies a positive-going pulse to the reset input of the address gate flip-flop 182. This resets the address gate 182 to a normal condition and removes the enabling bias from one of the diode inputs to the long mark pulse AND gate 150. The resetting of the address gate 182 indicates an error in the received address, insofar as the illustrated home unit 22 is concerned, and prevents the transmission of a reply from this home unit to the central office 20. Accordingly, so long as the mark to space transition terminating the initial transmitted bit occurs between 20 and 60 milliseconds following the original space to mark transition, it is assumed that the central office 20 has indeed transmitted a short duration signal having a nominal length of 36 milliseconds and that the transmitted first bit is a binary "0" forming the first bit of the address individual to the illustrated home unit 22.

Assuming that the central office 20 opens the signaling channel 24 to return it to a space condition a nominal 36 milliseconds after the preceding space to mark transition, the output winding 94 supplies a momentary negative-going pulse to the base of the transistor 96 so that a positive-going pulse is again applied to the reset terminal of the flip-flop 136. The flip-flop 136 supplies an enabling potential to the long space gate 138 and removes the enabling potential from the long mark gate 150. The transistor 96 also sets the line delay monostable circuit 148 so that the circuit 154 again resets the timing circuits 158 and 162, which have not timed out because of the short duration of the preceding pulse. At the end of the 16 millisecond delay provided by the circuit 148, the transistor 164 and the capacitor 166 drive the transistor 170 so that it provides a negative-going pulse to the AND gate 32. However, the gate 32 is inhibited by the time gate 28. The transistor 164 and the capacitor 168 again set the monostable circuit 158 and a counter drive monostable circuit 172. When this circuit times out (see line 6 in FIG. 11), the monostable circuit 28 is reset by the positive-going pulse forwarded through the diode 174 to remove the inhibiting signal from the input to the gate 32 (see line 9 in FIG. 11). The dashed portion in line 9 illustrates the full delay period of the time gate 28 when this gate is not positively reset. The timing out of the monostable circuit 172 also forwards a positive-going pulse through the OR circuit 180 to reset all of the counter stages 121–132. The resetting of the counter stage 121 forwards a positive-going pulse to the set input of the second counter stage 122 which persists following the reset pulse so that the second counter stage 122 is now operated (see line 7 in FIG. 11).

Figure 11:
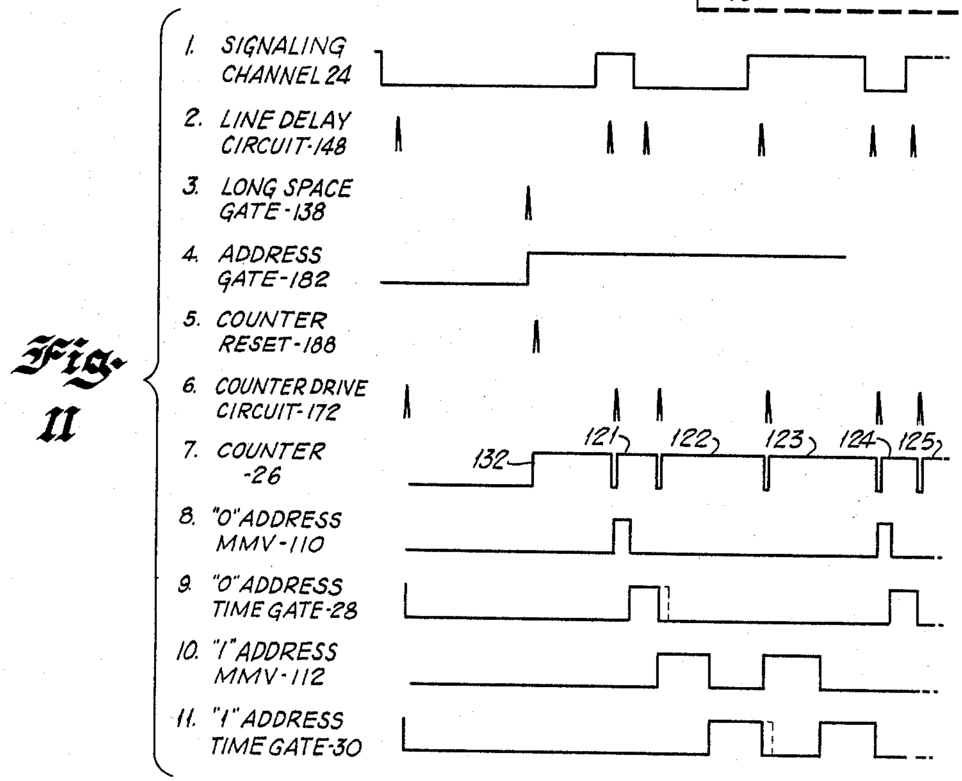
FIG. 11 is a timing diagram illustrating certain of the signals provided during the detection of an address in the home unit.
Figure 12:
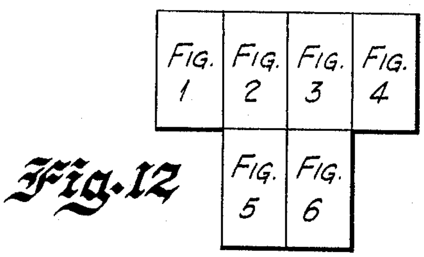
FIG. 12 is a block diagram illustrating the manner in which FIGS. 1–6 of the drawings are positioned adjacent each other to form a complete circuit diagram.

When the counter stage 122 is operated to a set condition, a positive-going pulse is forwarded through the diode 120 in the connected OR gate 114 and the switch 102 to set the address bit "1" monostable multivibrator 112 (see line 10 in FIG. 11). After a 50 millisecond time delay, the circuit 112 times out and forwards a positive-going pulse to set the binary bit "1" address time gate 30 (see lines 10 and 11 in FIG. 11). When the monostable circuit 30 is set, the lower input to the AND gate 32 is provided with an inhibiting potential. The home unit 22 is now in a condition to determine whether the space condition transmitted by the central office 20 persists for the nominal 100 millisecond interval to determine whether the transmitted bit is a binary "1."

More specifically, all of the diode inputs to the AND gate 32 are enabled, with the exception of the diode input connected to the collector of the transistor 170, from the time at which the gate 28 is reset on the timing out of the counter drive monostable 172 (see line 9 in FIG. 11) and a time 50 milliseconds later when the monostable circuit 112 times out to set the binary "1" gate 30 (see lines 10 and 11 in FIG. 11). If the central office 20 transmits a binary bit "0," the transistor 170 will supply a negative-going pulse 52 milliseconds following the preceding mark to space transition. Since the time gate 28 has been reset and the time gate 30 has not yet been set, the AND gate 32 will be fully enabled by the transistor 170, and the transistor 194 will reset the address gate flip-flop 182 to indicate an incorrectly received code bit. This indicates that the bit actually transmitted by the central office 20 was not the expected bit "1" having a nominal duration of 100 milliseconds.

On the other hand, the gate 30 is set 76 milliseconds following the preceding mark to space transition and inhibits the AND gate 32 for the following 60 milliseconds or until 136 milliseconds have elapsed since the preceding mark to space transition. If the transmitted bit is a binary bit "1" with a nominal length of 100 milliseconds, the transistor 170 provides a negative-going pulse 116 milliseconds following the preceding mark to space transition. The AND gate 32 is inhibited during this period, and the address gate 182 is not reset. If the bit transmitted by the central office 20 has a length of more than 120 milliseconds so that the transistor 170 provides a negative-going pulse more than 136 milliseconds following the preceding mark to space transition, the monostable circuit 30 has timed out, the lower diode input to the AND gate 32 is enabled, and this gate resets the address flip-flop 182 to indicate that the signal was longer than the 60 milliseconds acceptance band defined by the gate 30.

Assuming that the bit transmitted by the central office 20 is, in fact, a binary bit "1," the signaling channel 24 returns from a space condition to a mark condition at the end of 100 milliseconds, and the transistor 98 provides a positive-going pulse through the diode 192 that again sets the line delay monostable circuit 148. The setting of this circuit and its subsequent timing out perform the same functions described above except that when the counter drive monostable circuit 172 is set and reset, the time gate 30 is reset by the positive-going signal applied to the diode 176 prior to the expiration of its time delay (see lines 10 and 11 in FIG. 11). The unexpired portion of the delay of the gate 30 is shown in dashed line in FIG. 11. The timing out of the circuit 172 also resets the counter stage 122 and sets the counter stage 123 (see line 7 in FIG. 11). This in turn sets the monostable circuits 112 and 30 in sequence (see lines 10 and 11 in FIG. 11) so that the home unit 22 checks to determine whether the bit now being transmitted by the central office 20 has a long duration representing the binary bit "1" or a short duration representing the binary bit "0."

The AND gate 32, the timing circuits 28, 30, 110 and 112, and the counter 26 now operate in the manner described above to determine whether the bits transmitted by the central office 20 in the address sequence or word correspond to the designation individual to the illustrated home unit 22 represented by the settings of the switches 103–108. If all of the transmitted bits correspond to the expected bits, the address gate flip-flop 182 remains in its set condition with the enabling potential applied to the lower diode input of the long mark pulse AND gate 150. Alternatively, if one of the received bits does not correspond to an expected or known bit in the designation of the home unit 22, the AND gate 32 resets the flip-flop 182, and an inhibiting potential is applied to the lower diode input of the AND gate 150.

*Transmitting data from the home unit 22 to the central office 20*

As indicated above, the selected home unit 22 transmits information to the central office 20 over the signaling channel 24 representing the on-off condition and the tuning condition of one or more receivers located in the collaborator's home under the control of the data storage means 36. This means can comprise any suitable unit for supplying signals representing the operative condition of the receiver and its tuning condition. The data storage unit can comprise one or more switch controlled resistance matrix coding units of the type shown and described in detail in Currey Patent No. 2,881,417. The illustrated home unit 22 is shown as including two such data storage units **36*a* and 36*b*. Each of the units 36*a* and 36*b* supplies a low value alternating current potential to an on-off terminal when the connected television or wave signal receiver is in an off condition and applies a higher value of alternating current potential to this terminal when the connected receiver is in an on condition. Each of the units 36*a* and 36*b*** also applies a combination of high and low level alternating current potentials to four terminals representing the binary values "1," "2," "4" and "8." The high value alternating current potential represents a binary bit "1" and the lower value alternating current potential represents the binary bit "0." Thus, each of the units *36a* and *36b* provides a pattern of high and low alternating current potentials forming a binary coded representation of the on-off condition of the connected receiver and the tuning condition thereof.

The on-off terminals of the units *36a* and *36b* are each connected to one of a pair of gates 200 and the four terminals "1," "2," "4" and "8" in the units *36a* and *36b* are each connected to an input of one of eight gates 202. The gates 200 and 202 provide the gates 38 shown schematically in FIG. 10 of the drawings. Each of the gates 200 includes a storage capacitor 204 that is charged to either a high or low level negative potential in dependence on the magnitude of the alternating current potential supplied by the storage unit *36a* or *36b* through a diode 206. The level of the negative potential to which the storage capacitor 204 is charged is determined by the amount of positive direct current bias applied from a potentiometer 208 common to all of the gate circuits 200 and 202. The tap on the potentiometer 208 is also connected to the common return conductor in the units *36a* and *36b* so that the alternating current potential supplied to the gates 200 and 202 is superimposed on the positive bias provided by the potentiometer 208. This aids in the rejection of undesired low level alternating current signals. The capacitor 204 is charged to a high level potential when the receiver is in an on condition and is charged to the low level potential when the receiver is in an off condition.

Each of the gates 202 also includes a storage capacitor 210 that is charged to a high or low level negative potential through a diode 212 from the connected terminal of the storage units *36a* and *36b*. The capacitor 210 is charged to a high level negative potential when a binary bit "1" is stored and to a less negative potential when a binary bit "0" is stored. The levels of the potentials to which the storage capacitors 210 in the gates 202 can be charged is adjusted by the potentiometer 208.

As set forth above, the central office 20 provides a long mark pulse of around 200 milliseconds duration at the termination of the eight address bits to advise the selected home unit 22 that a reply is to be transmitted to the central office. This transition from a space to a mark condition on the line 24 terminates the last of the eight bits in the address sequence and is effective through the circuits described above to advance the counter 26 by resetting the eighth counter stage 128 and setting the ninth counter stage 129. It also initiates the sequential operation of the timing circuits 158 and 162. When the counter stage 129 is set, a negative enabling potential is forwarded to one of the diode inputs of the long mark pulse AND gate 150. Since the mark-space flip-flop 136 is operated to a mark setting and the reply gate 182 remains in its set condition indicating that a correct address has been received, the gate 138 is inhibited and all of the diode inputs to the AND gate 150 are enabled with the exception of the input connected to the output of the normally conductive transistor 142.

At the end of a 146 millisecond interval following the space to mark transition starting the long mark pulse, the timing circuit 162 resets and momentarily places the transistor 142 in a nonconductive condition. This provides a negative-going pulse to the remaining one of the diode inputs of the long mark pulse gate 150. This gate is completely enabled so that the transistor 152 provides a positive-going pulse at its output which is forwarded to the set input of a reply gate flip-flop 181. This pulse sets the bistable circuit 181 so that a positive-going pulse is coupled through a diode 214 in the OR gate 186 to again operate the counter reset monostable circuit 188. As described above, the operation and timing out of the circuit 188 resets the counter 26 to a normal condition and then places the preliminary or input stage 132 of this counter in a set condition.

When the reply gate bistable circuit 181 is set, the last inhibiting input is removed from the input of the gate 42, which gate is an OR gate for positive signals and an AND gate for negative signals. The complete enabling of the gate 42 applies a negative potential to the base of a transistor 216 so that a positive-going pulse is coupled through a pair of capacitors 218 and 220 and a pair of diodes 222 and 224 to the bases of a pair of transistors 226 and 228. The transistors 226 and 228 together with an additional transistor 230 provide a complementing monostable driver circuit 232 forming a part of the output means 44. In the normal condition of the circuit 232, the transistors 226 and 230 are in a conductive condition so that an output transistor 234 whose base is connected to the collector of the transistor 230 is normally in a nonconductive condition. The positive-going pulse coupled through the diode 224 does not serve a useful function at this time. However, the positive-going pulse coupled through the diode 222 places the transistor 226 in a nonconductive condition.

When the transistor 226 is placed in a nonconductive condition, the potential applied to the base of the conductive transistor 230 rises in a positive direction to terminate conduction through this transistor. The potential applied to the base of the transistor 228 now becomes more negative, and this transistor becomes conductive. When the transistor 228 is placed in a conductive condition, one terminal of a charged capacitor 236 is connected to ground so that a diode 238 is biased in its reverse direction. This removes the negative bias normally applied to the base of the transistor 226 and provides a positive bias for this electrode to maintain the transistor 226 in a nonconductive condition. When the capacitor 236 discharges sufficiently, the diode 238 becomes biased in a forward direction so that a negative potential is returned to the base of the transistor 226. However, the time constant of the discharging circuit for the capacitor 236 is such that the normal restoring time of the monostable circuit 232 is around 135 milliseconds. Thus, this circuit is normally positively driven to its alternate or restored state. However, in the event of a circuit malfunction, the circuit 232 will restore to a normal condition after the expiration of a time delay of approximately 135 milliseconds.

When the transistor 230 is placed in a nonconductive condition, a more negative bias is also applied to the base of the transistor 234 so that this transistor is placed in a conductive condition to energize the winding of a relay 240 that is connected to the signaling contacts *44a*. When the relay 240 is energized, the contacts *44a* are opened to interrupt the signaling channel 24. This terminates the long mark signal from the central office 20 and initiates the transmission of the first data bit in the intelligence to be transmitted from the selected unit 22 to the central office 20. When the continuity of the signaling channel 24 is interrupted, the transistor 96 provides a positive-going pulse in the manner described above which is again effective through the line delay monostable circuit 148 to produce the functions described above. Included in these operations is the operation of the counter drive monostable circuit 172 so that the counter 26 is advanced by resetting the counter stage 132 and by setting the counter stage 121. In addition, the positive-going pulse provided by the transistor 164 and the capacitor 168 is applied to the set input terminal of the monostable circuit 46 so that this circuit is operated to a set condition in which an inhibiting potential is applied to one of the diode inputs to the gate 42. This makes the potential applied to the base of the transistor 216 more positive so that this transistor is returned to a nonconductive condition. The transition of the transistor 216 from a conductive condition to a nonconductive condition does not affect the complementing monostable circuit 232.

When the first counting stage 121 is set, a positive-going signal is developed at its output terminal which is applied through a series resistor 242 to the anode of a diode 244 in the gate circuit 200. If the capacitor 204 is charged to a more negative potential by the output voltage from the connected unit 36a, the diode 244 is immediately placed in a conductive condition, and an output is not derived from the gate circuit 200. Thus, the gate circuit 200 does not provide an output if the related wave signal or television receiver is in an on condition and the storage capacitor 204 is charged to its greater negative potential. However, if the storage capacitor 204 is charged to its lesser negative potential, the positive-going swing in voltage provided at the output of the counter stage 121 does not immediately place the diode 244 in a conductive condition, and a differentiating network including a capacitor 246 and a resistance element 248 provides a positive-going pulse that is coupled through a diode 250 to the base of a normally conductive transistor 252 in a binary bit "1" detector circuit indicated generally as 254. The positive-going pulse applied to the base of the transistor 252 momentarily places this transistor in a nonconductive state so that a more negative potential is applied to the base of a transistor 256. This momentarily places the transistor 256 in a conductive condition so that a positive-going pulse is forwarded through a diode 258 to the set terminal of the binary bit "1" monostable circuit 40. This sets the circuit 40 so that an inhibiting signal is applied to another input of the gate circuit 42. Thus, both of the monostable circuits 46 and 40 are now in a set condition applying inhibiting signals to the input of the gate 42.

As indicated above, the two monostable circuits 46 and 40 provide means for determining the length of the bit representing signal transmitted over the signaling channel 24 under the control of the output means 44. The short duration or "0" monostable circuit 46 is operated in direct response to the application of a signal to the signaling channel 24 and, thus, is operated as each bit is transmitted to the central office 20. The binary bit "1" monostable circuit 40 possesses a greater time delay and is selectively operated in dependence on the receipt of an output from one of the gates 200 and 202. Thus, if the receiver associated with the unit 36a is in an on condition and no output is produced by the gate 200, the monostable circuit 40 is not set and the circuit 46 times out after 16 milliseconds delay or 32 milliseconds after the line break at the opened contacts 44a.

The timing out of the circuit 46 completes the enabling of the gate 42 so that the transistor 216 is placed in a conductive condition. This again forwards a positive-going pulse through the capacitors 218 and 220 and the diodes 222 and 224. Since only 32 milliseconds have elapsed, the monostable circuit 232 has not timed out, and the positive pulse provided by the transistor 216 places the transistor 228 in a nonconductive condition. When the transistor 228 is placed in a nonconductive condition, the transistor 226 and consequently the transistor 230 are placed in a conductive condition. When the transistor 230 is placed in a conductive condition, the potential applied to the base of the transistor 234 becomes more positive so that this transistor is placed in a nonconductive condition. This terminates the energization of the relay 240 so that the contacts 44a close to return the signaling channel 24 to a marking condition. This terminates the transmission of the first data bit "0" and initiates the transmission of the second data bit in the reply.

If the binary bit "1" timing means 40 had been set in the manner described above, the resetting of the "0" timing circuit 46 does not have any effect because one input to the gate 42 remains inhibited at the output of the monostable circuit 40. Thus, the gate 42 and the circuit 232 cannot release the relay 240 until the delay of the circuit 40 has expired. Because of its own delay and the delays introduced by the circuits 148 and 172, the monostable circuit 40 times out 79 milliseconds after the preceding change in the state of the signaling line 24 and, thus, produces a long duration signal representing the binary bit "1."

When the signaling channel 24 is returned to a marking condition, the transistor 98 again provides a positive-going output pulse which produces the same operations described above including the setting of the binary bit "0" timing means 46 and the operation of the counter 26 so that the counting stage 121 is reset and the counting stage 122 is set. When the stage 122 is set, a negative potential swing is forwarded through a resistor 260 in the connected gate 202 to the cathode of a diode 262. The anode of this diode is connected to the storage capacitor 210. If the capacitor 210 is charged to a small negative potential representing a binary bit "0" in dependence on the potential supplied from the terminal "1" in the connected unit 36a, the diode 262 is immediately placed in a conductive condition, and the gate 202 does not provide an output signal.

Alternatively, if the storage capacitor 210 is charged to the high level negative potential, the diode 262 is not immediately placed in a conductive condition, and the negative voltage swing from the output of the counter stage 122 is differentiated by a capacitor 264 and a resistance element 266 to provide a negative-going pulse that is forwarded through a diode 268 to the base of a normally conductive transistor 270 in the bit "1" detector circuit 254. This negative-going signal places the transistor 270 in a nonconductive condition to supply a positive-going pulse through a diode 272 to operate the timing circuit 40 to its set condition. In this manner, a short duration pulse controlled by the timing out of the circuit 46 is applied to the signaling channel 24 unless the gate 202 connected to the second counting stage 122 provides an output representing a binary bit "1." In this case, the timing circuit 40 controls the gate 42 to supply a longer duration pulse to the signaling channel 24.

The remainder of the items of information stored in two units 36a and 36b is transmitted over the channel 24 to the central office 20. In this connection, it should be noted that the last gate 202 is not provided with a signal input from the unit 36b but is connected to a manually operable switch 274 that supplies an input voltage to the gate 202 so that either one of the binary bits "1" or "0" can be transmitted. The last counter stage 131 and the connected gate 202 thus provide a means for adding another bit of information to the reply if desired.

When the last or eleventh bit of information controlled by the counting stage 131 and the connected gate 202 has been applied to the line 24, the resultant change in the status of the signaling channel by the timing out of one of the units 40 or 46 produces a signal that is forwarded through the line delay monostable circuit 148 in the manner described above to advance the counter 26 so that the stage 131 is reset to its normal condition. When this occurs, a capacitor 276 provides a positive-going pulse that is forwarded through the OR gate 179 to operate the reply gate flip-flop 181 to its reset condition. The more positive or ground potential applied by the flip-flop 181 to the lower diode input of the gate 42 disables this gate until such time as the next reply operation of the illustrated home unit 22 is to be initiated. Since the counter 26 transmits eleven bits of information during a transmitting cycle of the home unit 22, the last or eleventh bit is terminated by a transition of the signaling channel 24 from a space condition to a mark condition. Thus, the signaling channel 24 is now in a normal mark condition with the monostable circuit 232 in its normal condition.

The home unit 22 also includes means for detecting improper operation during a transmitting cycle and includes means operative upon the detection of this improper operating condition for terminating further transmitting operations. More specifically, the home unit 22 includes a gate circuit 280 including a pair of transistors 282 and 284. The base of the transistor 282 is connected to the output of the transistor 96 and is normally in a conductive condition. However, whenever a mark to space transition on the signaling channel 24 is detected, the transistor 96 provides a positive-going pulse which briefly places the transistor 282 in a nonconductive condition. This applies a negative bias to a diode 286 to bias it in its reverse direction. A second diode 288, whose cathode is connected in common with the cathode of the diode 286, is connected to the collector of the transistor 228 in the monostable circuit 232. The transistor 228 is in a nonconductive condition to bias the diode 288 in a reverse direction only when the signaling channel 24 is to be in a mark condition.

If the diode 288 is biased in a reverse direction, indicating that the sgnaling channel 24 is to be in a mark condition, and the diode 286 is biased in a reverse direction, indicating that the channel 24 has just transferred from a mark condition to a space condition, a negative potential is applied to the base of the transistor 284. This places the transistor 284 in a conductive condition so that a positive-going pulse is applied to the upper diode input of the OR gate 179. This positive-going pulse is applied to the reset input terminal of the reply flip-flop 181 and resets this flip-flop so that an inhibiting potential is applied to one input of the gate 42. This prevents the transmission of further information from the home unit 22 to the central office 20 by inhibiting further operation of the monostable circuit 232.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A selecting system using discrete bit representing signals of a first duration and a second duration, comprising a signaling channel to which said discrete signals of said first and second durations can be applied, counting means successively operated to different settings in response to the discrete signals applied to said channel, a detecting circuit, control means controlled by said counting means and coupled to the detecting circuit for conditioning said detecting circuit to receive the next bit of a known pattern of bit representing signals of said first and second durations, means controlled by each signal received from said channel for supplying a corresponding signal to said detecting circuit, and means controlled by said detecting means for providing an indication when any signal received from said channel has a duration other than the duration for which the detecting circuit has been conditioned.

2. The system set forth in claim 1 including data transmitting means, and means controlled by said detecting means for placing said data transmitting means in operation when the signals received from said channel have a pattern of first and second durations corresponding to said known pattern.

3. The system set forth in claim 1 including timing means in the control means and coupled to the detecting circuit, a storage means for storing a known data item, and means controlled by the storage means and connected to the timing means for operating the timing means to supply different duration signals to the detecting circuit in a timed sequence representing the known pattern of bit representing signals.

4. The signaling system set forth in claim 3 including means operated by successive signals on said channel for operating said timing means to supply successive signals to the detecting means.

5. In a signaling system using signals of at least two different durations, a signaling channel over which a sequence of discrete signals of different durations are transmitted representing data, detecting means supplied with signals from said channel, control means operated by each discrete signal on said channel for supplying said detecting means with a control signal representing a signal of one of said two durations, said control means supplying said control signals to said detecting means in a known sequence, and means controlled by said detecting means for providing an indication when the sequence of different duration signals supplied by said channel does not correspond to the sequence of control signals supplied to said detecting means by said control means.

6. In a signaling system for use with signals of different durations, a signaling channel over which said signals are transmitted in a sequence representing data to be transmitted, gate means supplied with signals from said channel, said gate means supplying an output signal whenever the duration of a signal on said channel does not correspond to an expected duration, and control means for supplying a series of time spaced inhibiting signals to said gate means representing a known sequence of different duration signals so that said gate means provides an output signal when the duration of one of the sequence of signals on the channel does not correspond to one of the signals in said known sequence.

7. In a signaling system in which data is transmitted by signals having two different durations, a signaling channel to which said signals are applied, detecting means supplied with signals, a first timing means connected to said detecting means and supplying a control signal to said detecting means for a period representing a first one of said durations, second timing means connected to said detecting means and supplying a control signal to said detecting means representing the other one of said durations, and control means for selectively operating said first and second timing means in a known sequence to supply a known sequence of said control signals to said detecting means for comparison with signals from said channel, and means controlled by said detecting means for providing an indication of whether the durations of the signals from said channel correspond to a known sequence of durations.

8. In a signaling system for use with signals of different durations, a signaling channel over which said signals are transmitted in a sequence representing data to be transmitted, gate means supplied with signals from said channel and including a plurality of inputs, a first timing circuit for supplying a first control signal representing one of said durations to a first one of said inputs, a second timing circuit for supplying a second control signal representing another of said durations to a second one of said inputs, control means for operating said first and second timing means to supply first and second control signals to the inputs of said gating means in a known sequence representing a known item of data, and means controlled by said gate means for providing an indication of whether the signals on said channel represent said known item of data.

9. In a data transmission system using signals of a long duration and signals of a short duration, a signaling channel for transmitting said signals of long and short durations, a gating means having at least a pair of signal responsive inputs, means controlled by said signal channel for applying a control potential to one of the inputs to said gating means corresponding to said signals of long and short durations, control means connected to the other of said inputs to said gating means for applying control potentials of two different durations to said gating means representing said long and short signal durations, counting means operated to successive different settings by the signals on said channel to operate said control means to apply control potentials to a known pattern of long and short durations to said gating means, and output means controlled by said gating means for providing an indication of whether the durations of the signals received from said channel correspond to said known pattern.

10. In a signaling system using signals of at least two different durations, a signaling channel over which a sequence of said signals are transmitted representing an item of data, gating means having a plurality of inputs and an output, means controlled by the signals on said channel for applying an enabling signal to one input of said gating means representing the end of each signal in the sequence transmitted over said channel, a plurality of timing means each operable to apply an inhibiting signal to one of the inputs to said gating means representing one of said different duration signals, storage means for storing a known data item and for operating said plurality of timing means to apply a sequence of inhibiting signals to said gating means representing said known item of data, and means connected to the output of said gating means for providing an indication of whether the transmitted item of data corresponds to the known item of data.

11. In a data transmission system, a signaling channel operable between two different signaling states, counting means successively operable to different settings in response to each transition on said signaling channel between said two states, a detecting circuit, a plurality of gate means each connected between said detecting circuit and said counting means, each of said gate means being operated in a different one of the settings of said counting means to control the response of said detecting means to signals received from said channel, and means for supplying signals from said channel to said detecting means.

12. In a signaling system, a signaling channel, signal generating means connected to said channel and including two timing means for controlling the signal generating means to apply signals of two different durations to said channel, data storage means for storing an item of data to be transmitted, means controlled by said data storage means for operating one of said timing means, and means controlled by signals received from said channel for operating the other of said timing means.

13. In a signaling system in which data is transmitted by a sequence of signals of at least two different durations, a signaling channel, means including first timing means for applying a signal of a first duration to said channel, means responsive to each signal applied to said channel for operating said first timing means, means including second timing means for applying a signal to said channel of a second duration longer than said first duration, data storage means for storing an item of data to be transmitted, and means controlled by said data storage means for selectively operating said second timing means.

14. The signaling system set forth in claim 13 including a plurality of gate means controlled by said data storage means for operating said second timing means, and counting means for counting the number of signals applied to said channel and for enabling said gata means in sequence.

15. The system set forth in claim 13 in which the means including first timing means and the means including second timing means include a common signal generator coupled to the channel, said signal generator including a bistable circuit operated to alternate stable states as each signal in the sequence is transmitted under the control of the first and second timing means.

16. The system set forth in claim 13 in which the first and second timing means include monostable circuits.

17. In a signaling system in which data is transmitted by a sequence of signals of different durations, a signaling channel, signal generating means for applying signals to said channel by changing the conductive state of the channel, a first monostable means for controlling said generating means to apply a signal of a first duration to said channel, a second monostable means for controlling said generating means to apply a signal of a second duration to said channel, data storage means for storing a data item, a plurality of gate means connected between said data storage means and said first monostable means, counting means for enabling said gate means in sequence, and means responsive to a change in the state of the channel for applying an operating signal to said second monostable means and said counting means.

18. The signaling system set forth in claim 17 including a logic gate connected between said signal generating means and said first and second monostable means.

19. In a signaling system, a signaling line, switching means operable to alternate states for opening and closing a circuit through said line, first timing means for operating said switching means at the end of a first time interval, second timing means for disabling the control of said switching means by said first timing means and for operating said switching means at the end of a second time interval, means for operating said first timing means each time the state of said line is changed, data storage means for storing an item of data to be transmitted, and means controlled by said data storage means for operating said second timing means.

20. In a signaling system, a signaling channel over which address data and intelligence data can be transmitted by a series of signals of at least two different durations; first storage means for storing a known address; a first pair of timing means, one of said first pair of timing means providing a control signal representing a signal of a first duration and the other of said first pair of timing means providing a control signal representing a signal of a second duration; address detecting means provided with said first and second control signals and signals corresponding to the signals on said channel; counting means; means including said counting means and said first storage means for operating said first pair of timing means to supply a sequence of control signals of said first and second durations to said address detecting means representing said known address for comparison with address signals on said channel; reply means controlled by said address detecting means for indicating when a sequence of signals on said channel represents said known address; signaling means for applying a sequence of signals to said different durations to said channel; a second pair of timing means for controlling the operation of said signaling means, one of said second pair of timing means providing a signal representing said first duration and the other of said second pair of timing means providing a control signal representing said second duration; second data storage means for intelligence data to be transmitted; and control means including said counting means and said second data storage means and placed in operation under the control of said reply means for selectively operating said second pair of timing means in accordance with the intelligence data stored in said second data storage means.

21. The signaling system set forth in claim 20 including means responsive to signals on said channel of either one of said two durations for operating said counting means.

22. The signaling system set forth in claim 20 including means controlled by said signaling means and by signals derived from said channel for arresting operation of said signaling means when a signal applied to said channel is not the same as the signal that the signaling means is attempting to apply to said channel.

23. In a signaling system, a signaling line over which alternate condition signals representing different bit values are transmitted, signal generating means for applying said alternate condition signals to said line, first means controlled by the signal generating means for providing a first control signal representing the one of the alternate signals that the signal generating means is attempting to apply to the signaling line, second means controlled by the line for providing a second control signal representing the one of the alternate signals actually applied to the signaling line, and means controlled by said first and second control signals for providing an indication of whether the signaling line is receiving the same one of the alternate signals that the signal generating means is attempting to apply to the line.

24. In a signaling system, a signaling line operable between alternate mark and space conditions, first means responsive to each transition of the line from a mark condition to a space condition for developing a series of signals each representing a mark-to-space transition of said line, second means responsive to each transition of the line from a space condition to a mark condition for developing a series of signals each representing a space-to-mark transition of said line, a bistable circuit supplied with signals from said first and second means and operable to alternate mark and space conditions by said signals so as to provide a stable indication of the condition of the line, combining means for combining the two series of signals developed by said first and second means to provide a single series of signals representing mark-to-space and space-to-mark transitions of said line, and data utilizing means controlled by said bistable circuit and said combining means.

25. The signaling system set forth in claim 24 including magnetic core means inductively coupled to said line, and means inductively coupling said core means to said first and second means.

26. The signaling system set forth in claim 24 in which said utilizing means includes a pair of logic gate means and means controlled by said bistable circuit for selectively enabling alternate ones of said logic gate means.

27. In a data handling system, a plurality of pulse forming networks, a plurality of voltage responsive means each connected to one of the pulse forming networks to control its operability, each of the voltage responsive means providing an impedance means connected in parallel with a pulse forming network and providing a value of impedance varying in dependence on the voltage applied to the voltage responsive means, a source of data bits to be transmitted, input means controlled by said source for applying different voltages to said voltage responsive means representing the data bits to be transmitted, and signal generating means for applying a signal to said pulse forming networks in sequence, said signal generating means including a counting circuit having a counter stage connected to each of said pulse forming networks.

28. The data handling system set forth in claim 27 in which said voltage responsive means includes diode means connected to the pulse forming network and capacitive means connected to said input means.

29. A signaling system for transmitting signals of at least two different durations over a signaling channel comprising switching means connected to the channel and operable to two different states to place the channel in two different states, a bistable circuit connected to the switching means and operable to two different alternate states, the operation of the bistable circuit to its two different states operating the switching means to corresponding different alternate states, a logic gate coupled to the bistable circuit and supplying signals to the bistable circuit for operating the bistable circuit to its alternate states, first timing means coupled to the channel and the logic gate and operable to control the logic gate to supply a signal to the bistable circuit at the end of a first time interval, a second timing means coupled to the logic gate and operable to control the logic gate to supply a signal to the bistable circuit at the end of a time interval different from the first time interval, and data storage means for controlling the second timing means.

30. A signaling system comprising a signaling channel over which data is transmitted in two directions in the form of signals of different time durations, a counting circuit including a plurality of bistable counting circuits operable to different stable states in sequence, a signal responsive circuit coupled to the channel and the counting circuit and responsive to the receipt of each signal from the signaling channel for advancing the counting circuit a single step, first timing means operable in synchronism with the receipt of signals from the channel for distinguishing the durations of different received signals, means controlled by the counting circuit and the first timing means for comparing the pattern of the durations of the signals received from the channel with a known pattern of durations of a known signal sequence, a data transmitter including second timing means for sending signals of the different durations over the signaling channel, the second timing means including a first timing circuit and a second timing circuit, a bistable output circuit in the data transmitter connected to the channel and operable to two alternate states to place the channel in two corresponding states, means coupling the bistable output circuit to the first and second timing circuit to provide means for timing the operation of the bistable output circuit between its different stable states, means coupling the first timing circuit to the signal responsive circuit, data storage means, means controlled by the data storage means and the counting circuit for operating the second timing means, and a circuit for placing the transmitter in operation when the durations of a sequence of signals received from the signaling channel correspond to the durations of the known sequence.

References Cited by the Examiner

UNITED STATES PATENTS

| | | | |
|---|---|---|---|
| 2,708,744 | 5/1955 | Neiswinter | 340—164 |
| 3,017,610 | 1/1962 | Auerbach et al. | 340—172.5 |
| 3,067,290 | 12/1962 | Greenaway et al. | 179—7 |
| 3,118,131 | 1/1964 | Wright | 340—167 |
| 3,229,256 | 1/1966 | Van Boois et al. | 340—172.5 |

ROBERT C. BAILEY, *Primary Examiner.*

R. RICKERT, *Assistant Examiner.*